(12) United States Patent
Mitani

(10) Patent No.: US 7,805,071 B2
(45) Date of Patent: Sep. 28, 2010

(54) CAMERA MODULE AND ELECTRONIC DEVICE

(75) Inventor: Yoshifumi Mitani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 250 days.

(21) Appl. No.: 12/220,379

(22) Filed: Jul. 24, 2008

(65) Prior Publication Data
US 2009/0034962 A1    Feb. 5, 2009

(30) Foreign Application Priority Data
Jul. 31, 2007    (JP) .............................. 2007-198690

(51) Int. Cl.
*G03B 17/02*    (2006.01)
(52) U.S. Cl. ..................................... 396/535
(58) Field of Classification Search ................. 396/535, 396/541
See application file for complete search history.

(56) References Cited

U.S. PATENT DOCUMENTS 7,652,718 B2 *    1/2010    Fujioka et al. .............. 348/374

2004/0017501 A1    1/2004    Asaga et al.

FOREIGN PATENT DOCUMENTS

| JP | 2006-033296 | 2/2006 |
| JP | 2006-229335 | 8/2006 |
| JP | 2007-028430 | 2/2007 |

* cited by examiner

*Primary Examiner*—W. B. Perkey
(74) *Attorney, Agent, or Firm*—Brinks Hofer Gilson & Lione (57) ABSTRACT

There is provided an inexpensive camera module 1 having shieldability. The camera module 1 has a housing 2 which is molded from resin so that layers of the resin are formed on both sides of a metal plate 5 and in which an inside space for accommodating a group of lenses 6, 7 is formed and which is opened at least in one direction, a lid 3 for sealing the opened part of the housing 2, and a substrate 4 on which an imaging element 10 is mounted. In the housing 2, the metal plate 5 is partially exposed, and the lid 3 composed of conductive material and ground patterns 22 on the substrate 4 are in conductive contact with exposed parts 19, 21 of the metal plate 5.

20 Claims, 8 Drawing Sheets

FRONT SIDE

BACK SIDE

CAMERA MODULE AND ELECTRONIC DEVICE

This application is based on application No. 2007-198690 filed in Japan, the contents of which are hereby incorporated by reference.

BACKGROUND OF THE INVENTION

The present invention relates to a camera module and an electronic device having the camera module.

A camera module, which has imaging elements, electronic components for processing image signals, and the like, is preferably shielded in order that electromagnetic interference therewith from outside may be prevented.

In US 2004 0017501 A1 is disclosed a camera module that is provided with electromagnetic shieldability by formation of a conductive resin layer on a surface of a housing (case) on occasion of molding of the housing. There is a danger, however, that the use of conductive resin may cause unexpected short circuit. Therefore, the use makes it necessary to provide insulating members therein. There are problems in that the insulating members hinder reduction in size of the camera module and make the camera module expensive.

In JP 2006-33296 A is disclosed a camera module in which a cover composed of a metal plate covering an optical unit including lenses and covering an imaging unit including an imaging element is connected to a ground on a substrate of the imaging unit. The covering of the optical unit and the imaging unit with the metal cover, however, makes it difficult to reduce a size of the camera module and makes the camera module expensive.

Though it would be desirable if a housing could be formed by press working of a metal plate, a sufficient machining accuracy cannot be attained by press working. In a camera module having functions of zooming, focusing and the like, particularly, guide shafts for guiding lenses and the like are required to be accurately mounted in a housing, therefore the housing is desired to be formed by injection resin molding in which a high dimensional accuracy can be expected.

It is also required that high rigidity should be ensured in the housing because the housing may be subjected to an accidental impulsive force. In an imaging unit having both small size and high performance, it is difficult to ensure the rigidity of the housing without increase in size thereof because the housing is often required to be composed of a single structural member and to be provided with a large opening for installation of a group of lenses and the like as well as for an optical path for imaging.

SUMMARY OF THE INVENTION

In consideration of the above problems, an object of the invention is to provide an inexpensive camera module having shieldability.

In order to achieve the object, the camera module of the invention has an optical system for projecting an optical image of a subject, an imaging element for converting the optical image projected by the optical system into electric signals, a housing which is molded from resin so that resin layers are formed on both sides of a metal plate, in which an inside space for accommodating the optical system is formed, and which is opened at least in one direction, a lid for sealing opened part of the housing, and a substrate on which the imaging element is mounted.

In this configuration, the housing can be provided with electromagnetic shieldability and strength by resin molding with insertion of the metal plate. Details of a shape of the housing are defined by the resin having undergone the molding, and a high dimensional accuracy of the housing is thereby achieved even though the metal plate is a pressing with a low machining accuracy.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
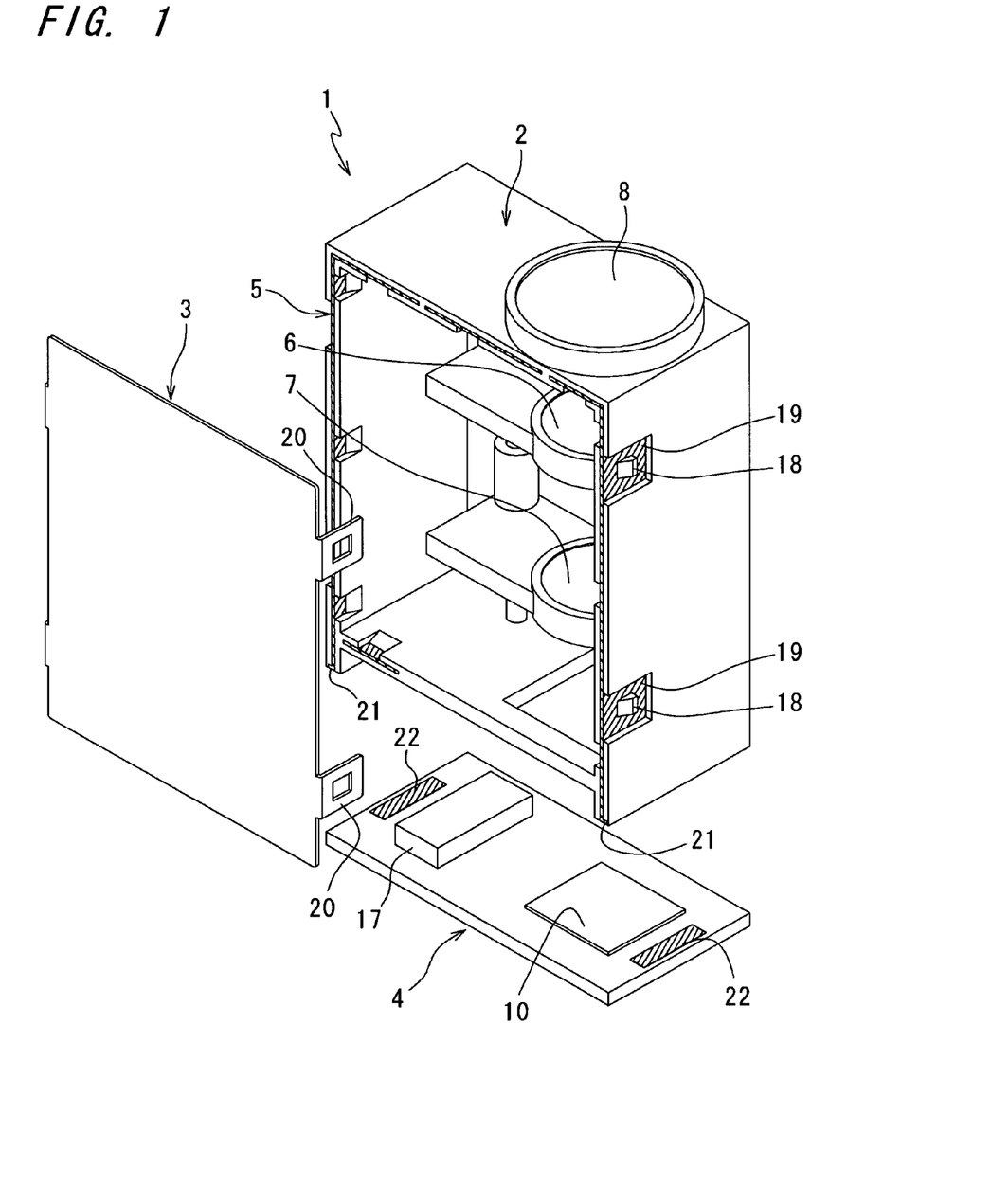
FIG. 1 is an exploded perspective view of a camera module in accordance with a first embodiment of the invention.
Figure 2:
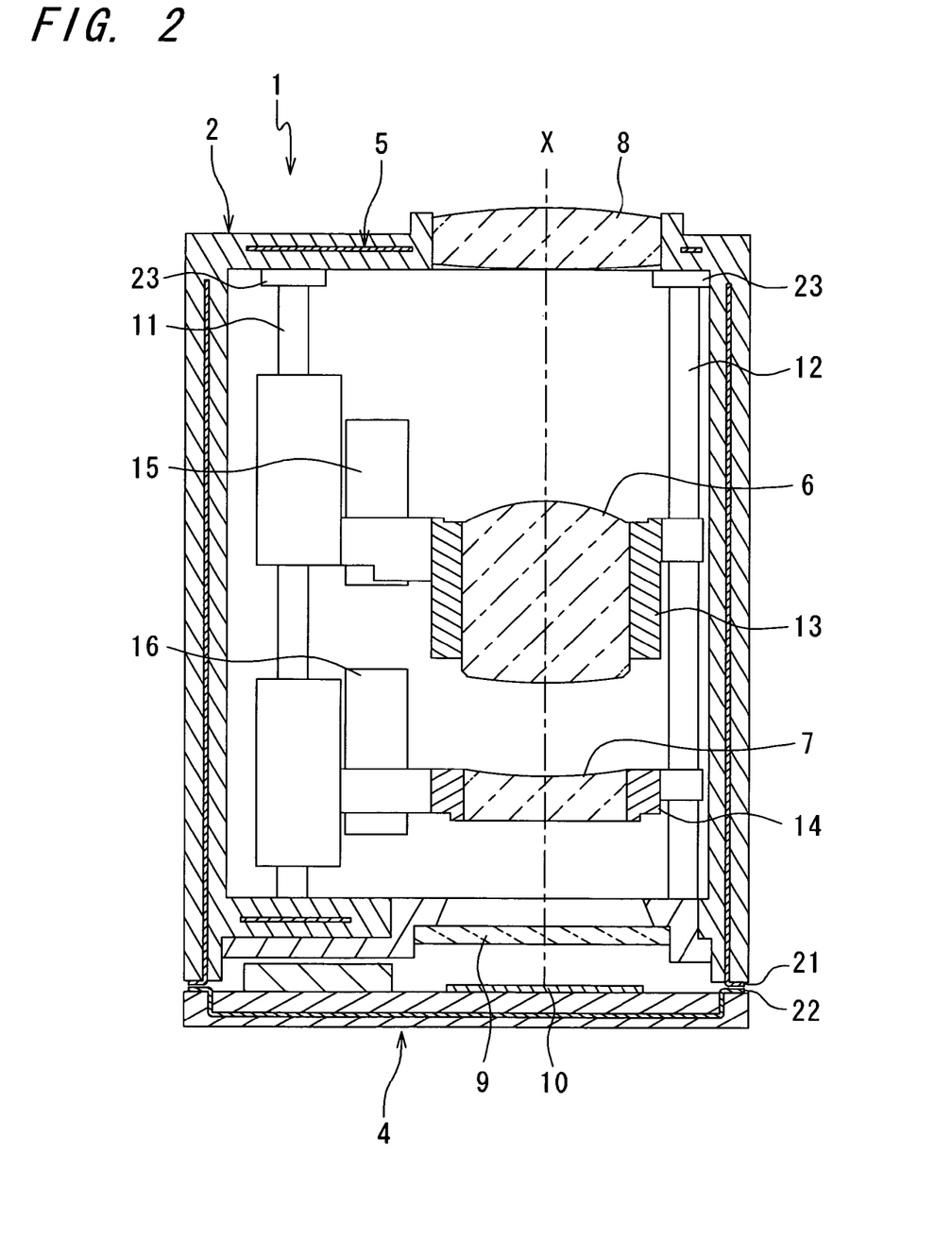
FIG. 2 is a sectional view of the camera module of FIG. 1.

FIGS. 1 and 2 show a camera module 1 in accordance with a first embodiment of the invention. The camera module 1 is composed of a housing 2 generally shaped like a box with one face opened, a lid 3 for sealing the opened part of the housing 2, and a substrate 4 fixed to the housing 2.

Figure 3:
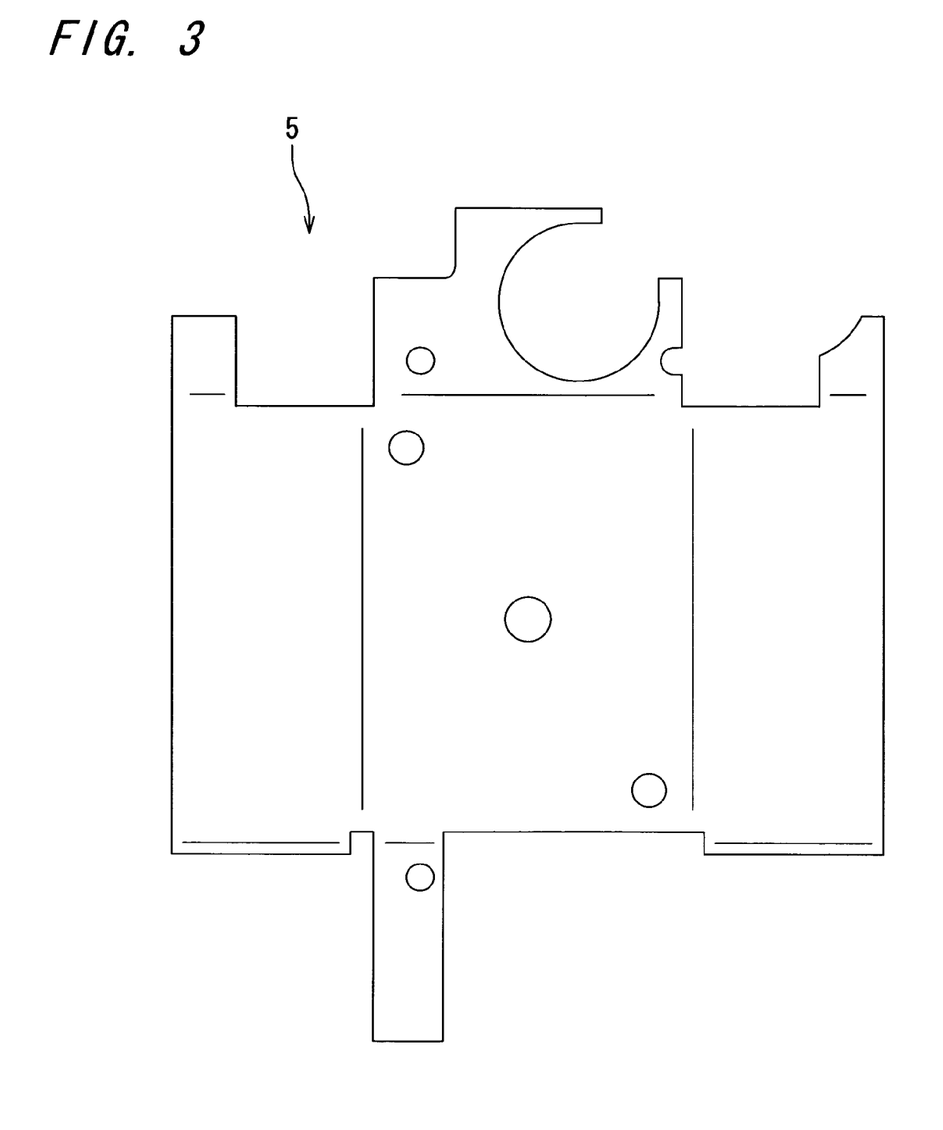
FIG. 3 is a development view of a metal plate in the camera module of FIG. 1.

The housing 2 is produced by press working of a metal plate 5 that is made of a steel plate having a thickness, e.g., not larger than 0.3 mm and shown in a development of FIG. 3 and that is made generally into shape of the box, and by formation of resin layers on both outer and inner surfaces of the metal plate 5 by injection molding. The housing 2 is in shape of the box of which the one face having the largest area is opened, and defines an inside space that accommodates an optical system composed of a group of lenses including lenses 6, 7 having an optical axis X parallel to the opened face. All surfaces (walls) of the housing 2 include the metal plate 5 at least partially. In the housing 2, an opening that holds an objective lens 8 facing a subject is formed on one of two faces having the smallest area. To and on the other face, a filter (which is omitted in FIG. 1) is fixed and an opening that faces an imaging element 10 through the filter 9 is formed. In place of the filter 9, there may be fixed a lens.

The lenses 6, 7 are held by lens frames 13, 14 movable along two guide shafts 11, 12 that are held at both ends thereof by the housing 2 and that are parallel to the optical axis X. The lenses are positioned by actuators 15, 16 (which are omitted in FIG. 1). The optical system including the lenses 6, 7 projects an optical image of a subject on the imaging element 10, which then converts the projected optical image into electric signals. Provided that positions of the lenses 6, 7 are required to be detected, there can appropriately be provided position detection sensors.

The imaging element 10 is mounted on the substrate 4 joined to the housing 2, together with an electronic component 17 for processing signals produced by the imaging element 10. On the substrate 4 can be mounted not only the electronic component 17 but also electronic components such as ICs for driving the actuators 15, 16 and memory storages.

The camera module 1 has the lid 3 that is for sealing the opened part of the housing 2 and that is composed of a metal plate. On the housing 2 are formed engagement recesses 19 in which the resin layer is cut out so that engagement protrusions 18 remain on an outer wall and so that the metal plate 5 is exposed. The lid 3 has engagement hooks 20 that are to be fitted in the engagement recesses 19 and are to be engaged with the engagement protrusions 18 while being in conductive contact with the metal plate 5.

The metal plate 5 has contact parts 21 that are exposed on an end face thereof to which the substrate 4 is to be joined and that are bent along the end face. The substrate 4 is a multilayer substrate of which one layer forms ground patterns 22 for contact with the contact parts 21, such that the metal plate 5 is grounded through the substrate 4.

Thus malfunctioning of the imaging element 10, the electronic component 17 and the like can be prevented by the electrical connection between the metal plate 5 of the housing 2, the lid 3, and the ground patterns 22 on the substrate 4, which form an electromagnetic shield for preventing invasion of electromagnetic noises into the camera module 1.

Figure 4:
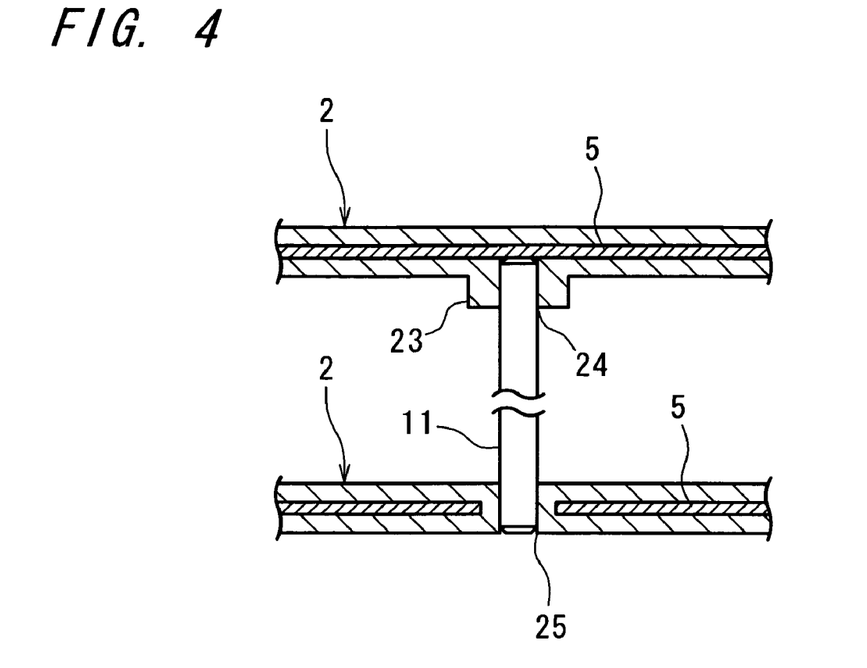
FIG. 4 is an enlarged fragmentary sectional view showing a mount structure of a guide shaft in the camera module of FIG. 1.

The guide shafts 11, 12 are each held with one end inserted into a mount hole 24 which has a boss 23 formed of a protruded inner wall of the housing 2 and in which an inner surface of the metal plate 5 is exposed, and with the other end inserted into a through hole 25 in which an inner periphery of an opening provided on the metal plate 5 is covered with the resin, as shown with regard to the guide shaft 11 in FIG. 4. The guide shafts 11, 12 are held by the resin formed accurately by injection molding and are thus capable of guiding the lens frames 13, 14 so as to accurately align the lenses 6, 7 with the optical axis X. Provided that the guide shafts 11, 12 are made of metal, the guide shafts 11, 12 can be grounded in conductive connection with the metal plate 5 and can be prevented from functioning as antennas that negatively affect circuits on the substrate 4. On the mount hole 24 is provided the boss 23 for ensuring an accuracy and a strength of the hold by increase in a length for the fit on the guide shafts 11, 12. The boss 23, however, may be omitted on condition that the accuracy and the strength are not required.

Figure 5:
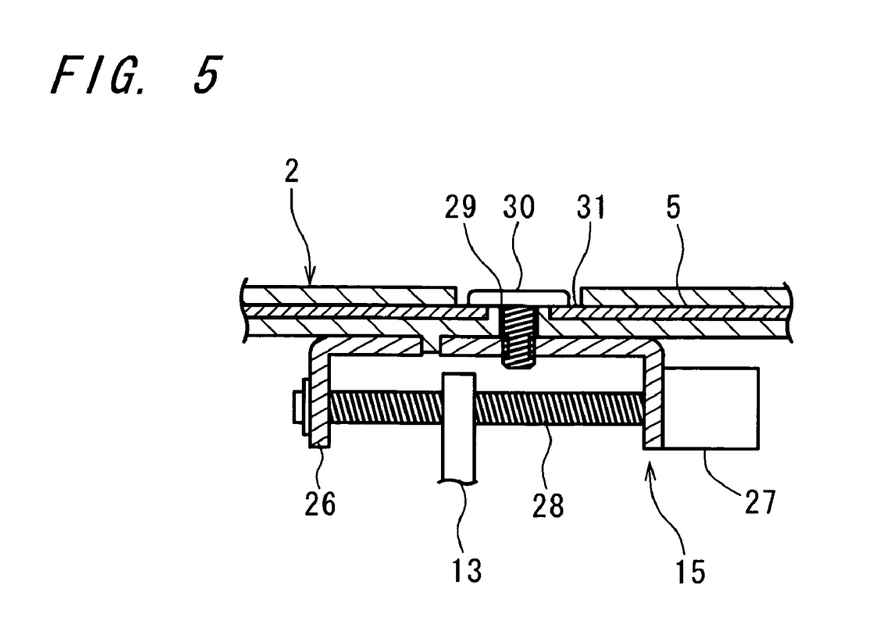
FIG. 5 is an enlarged fragmentary sectional view showing a mount structure of an actuator in the camera module of FIG. 1.

As in the actuator 15 shown in FIG. 5, for example, the actuators 15, 16 are each composed of a motor 27 and a feed screw 28 that are held by a frame 26. With rotation of the feed screw 28, the actuator drives the lens frame 13(14) engaging with the screw. The frame 26 is positioned by a protrusion provided on an inner surface of the housing 2, and is fixed to the housing 2 by a screw 30 penetrating a through hole 29. Around the through hole 29, a spot facing 31 that exposes the metal plate 5 is formed so as to receive a head of the screw 30. This prevents the head of the screw 30 from protruding from an outer surface of the housing 2 and allows the screw 30 to be accurately positioned with aid of the resin accurately formed by injection molding. Furthermore, reception of a clamping force of the screw 30 by the metal plate 5 prevents an excessive stress from being exerted on the resin layer and makes it unnecessary to provide reinforcement such as increase in thickness of the resin layer. There is another advantage in that the actuator 15 can electrically be connected and grounded to the metal plate 5 through the screw 30. Though the motor 27 and the feed screw 28 are held by the frame 26 in the embodiment, the mount hole 24 that has been described may be used as a bearing structure for the feed screw 28, and the motor 27 may be held by the mount hole 24.

Figure 6:
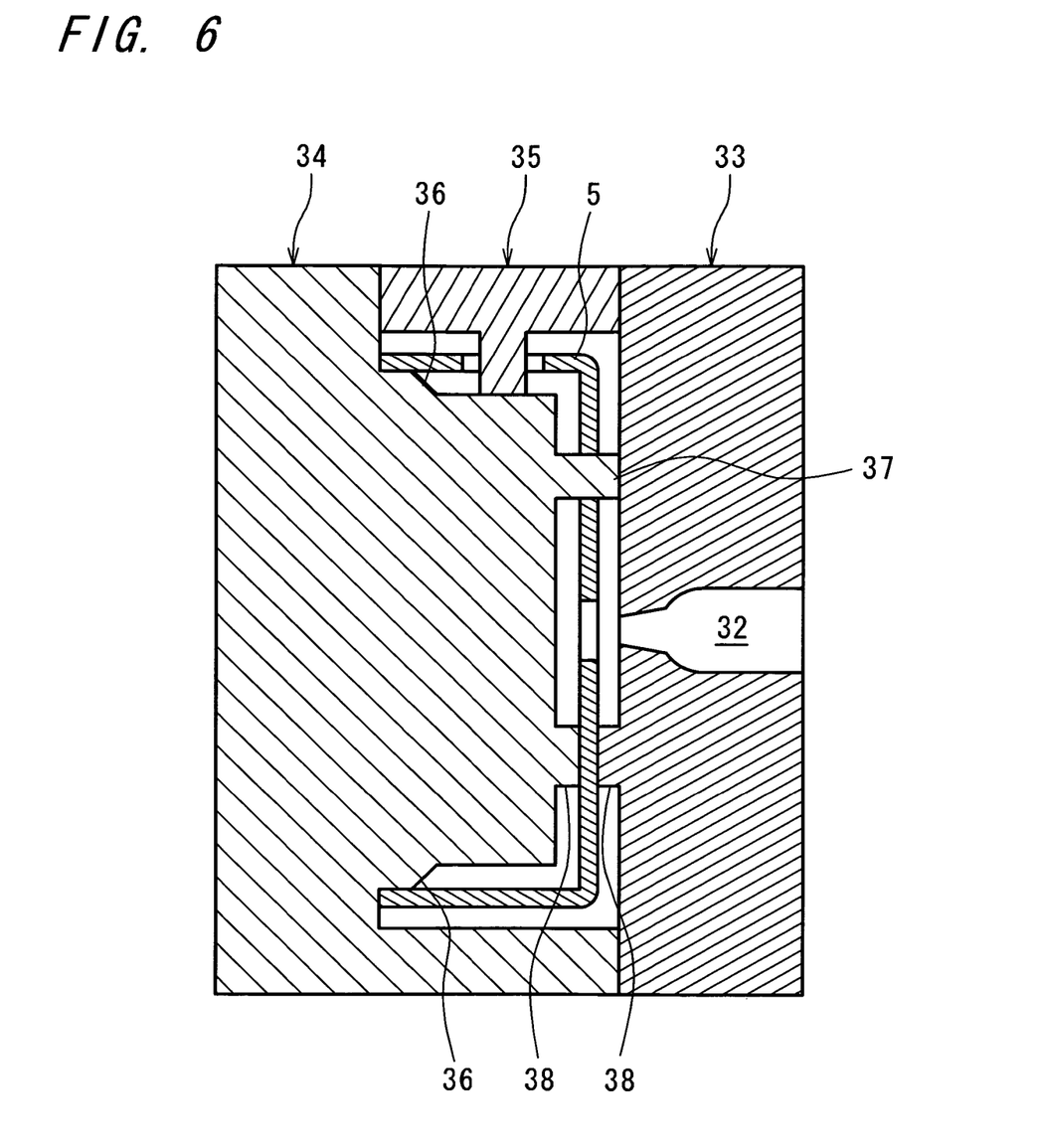
FIG. 6 is a configuration of a mold for molding a housing of the camera module of FIG. 1.

FIG. 6 shows a configuration of a mold for forming the resin layers on the housing 2. The mold is composed of a fixed die 33 having a gate 32 for injection of the resin, a movable die 34 that can be moved so as to make and lose contact with the fixed die 33, and a slide core 35 that can be pulled out perpendicularly to a direction in which the movable die 34 is movable.

The movable die 34 has clinging parts 36 that partially protrude so as to be brought into contact with inside of end parts of the metal plate 5. The metal plate 5 is formed generally into shape of a box by press working, in advance, and is inserted into the mold while being positioned therein with a protrusion 37 engaged with a through hole provided on the metal plate 5. In the press working, interior angles of the metal plate 5 are formed so as to be slightly smaller than 90°. Thus the metal plate 5 brings its end parts into press contact with the clinging parts 36 by an elastic force exerted by itself. In order to facilitate the insertion of the metal plate 5, the clinging parts 36 are preferably slanted for forcing the metal plate 5 open. The metal plate 5 had better be partially decreased in rigidity by provision of cutouts or the like in vicinity of the parts thereof for contact with the clinging parts 36 so that deformation may not be caused by an internal stress after the molding. A surface of the metal plate 5 orthogonal to the direction in which the movable die 34 is movable can be positioned so as to produce spaces for formation of the resin layers on both sides of the plate, with the surface interposed and held between pinching parts 38 provided on the fixed die 33 and on the movable die 34. The dies 33, 34 can be prevented from being fractured, with a gap between the pinching parts 38 made slightly larger than a thickness of the metal plate 5.

The slide core 35 is intended for forming the through holes 25, the spot facing 31 and the like in which the guide shafts 11, 12, the screw 30 and the like are to be mounted.

In a position on the metal plate 5 facing the gate 32, an opening is preferably provided so as to facilitate introduction of the resin to both sides of the plate. On other parts of the metal plate 5, cutouts or openings allowing communication in the resin are preferably formed in accordance with the shape of the mold. Such cutouts or openings connecting the resin layers on both sides of the metal plate 5 are capable of smoothing flow of the resin during the injection molding and improving dimensional accuracy of the molded product. The openings, however, are preferably formed by recessing so as not to impair the rigidity of the metal plate 5.

The housing 2 having the resin layers formed on both sides of the metal plate 5 has high rigidity due to presence of the metal plate 5 even though the housing has thin walls. As a result, the one face of the thin housing 2 can be widely opened so as to facilitate installation therein of such an optical system as the lenses 6, 7 and the like, as in the embodiment.

Figure 7:
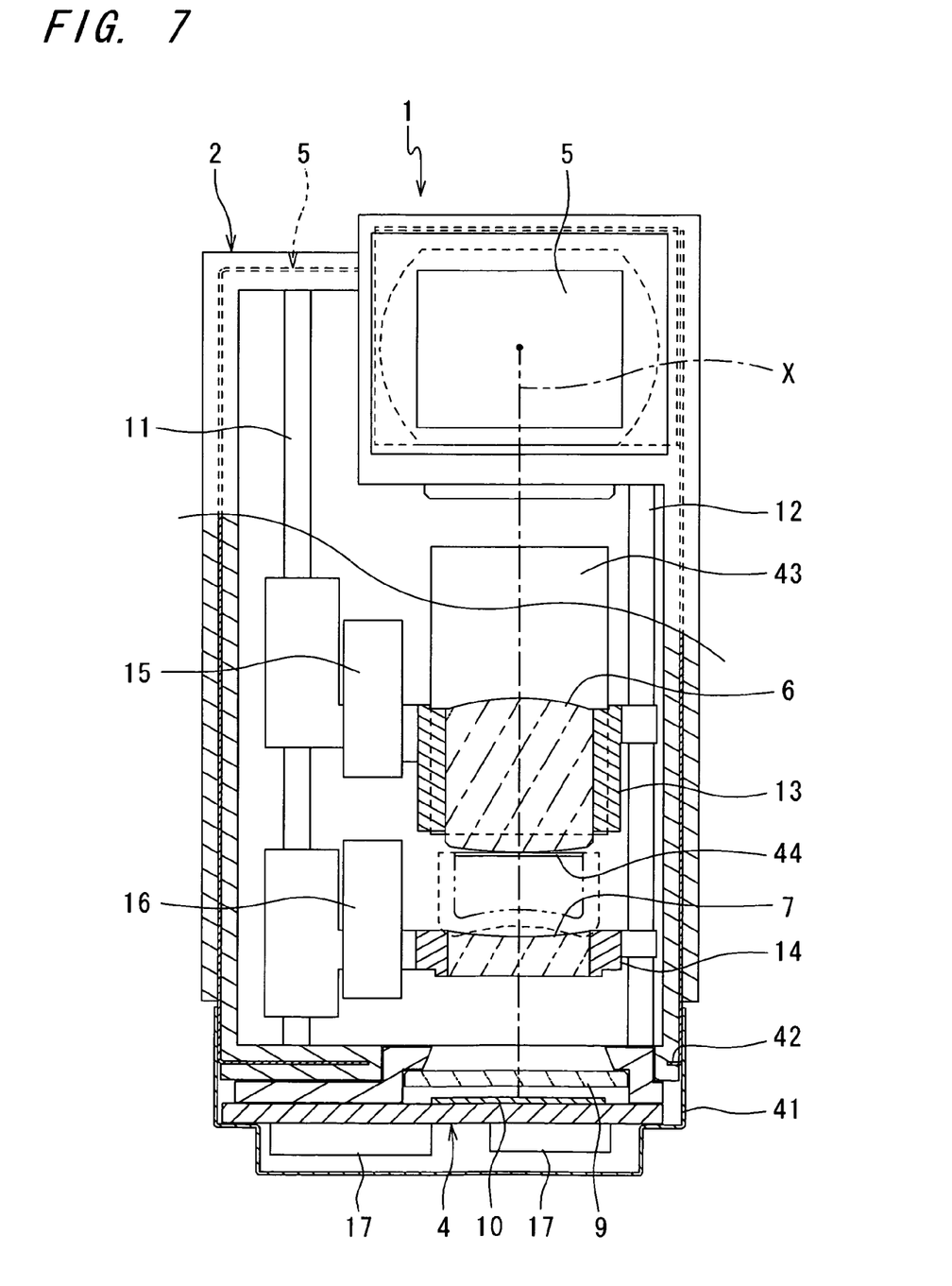
FIG. 7 is a fragmentary front sectional view of a camera module in accordance with a second embodiment of the invention.
Figure 8:
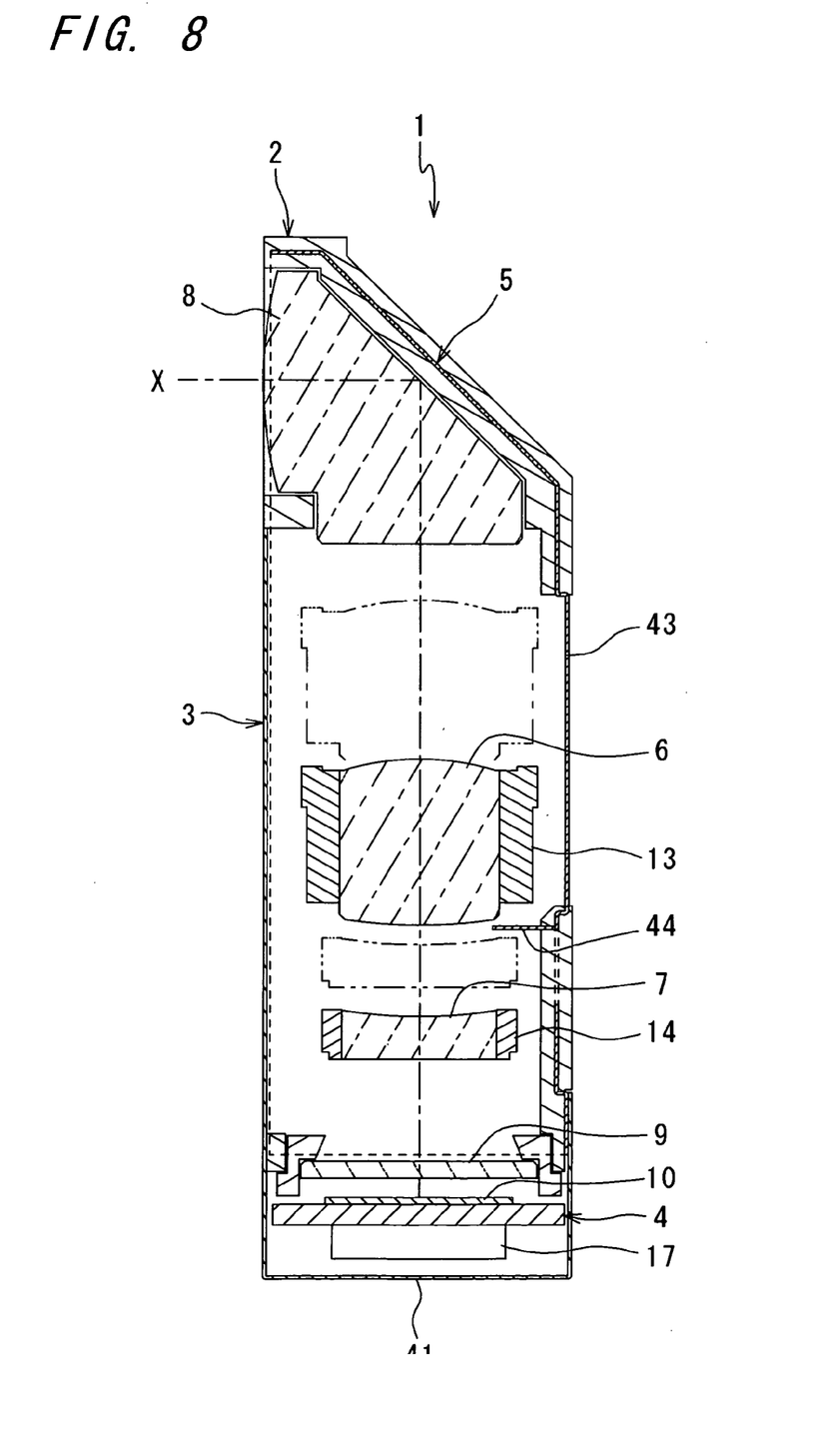
FIG. 8 is a side sectional view of the camera module of FIG. 7.

FIGS. 7 and 8 show a camera module 1 in accordance with a second embodiment of the invention. For the embodiment, components thereof the same as those of the first embodiment are designated by the same reference numerals and description of the components is omitted.

In the camera module 1 of the embodiment, an objective lens 8 doubles as an optical member (prism) for turning an optical axis X into a direction in which a housing 2 opens.

In the camera module 1, electronic components 17 are mounted also on a back surface (outer side of the camera module 1) of a substrate 4. The substrate 4 is covered with a substrate cover 41 that is made of metal and that is formed integrally with a lid 3, so that the substrate 4 is held while being pressed against the housing 2. The substrate cover 41 is in conductive contact with a metal plate 5 in the housing 2. The substrate cover 41 forms an electromagnetic shield for preventing invasion of noises into the electronic components 17 mounted on the back surface of the substrate 4 and propagation of noises from the electronic components 17 to outside.

The substrate cover 41 may be formed of magnetic material and as a member separate from the lid 3. In this configuration, the insulative substrate cover 41 cancels worry for a short circuit in a circuit connected to the substrate 4 in an electronic device in which the camera module 1 is installed.

An end portion of the metal plate 5 is folded and formed into a rib 42 that bites into a resin layer of the housing 2. Thus rigidity of the housing can further be increased. Provided that the rib 42 is formed in vicinity of center of a planar part of the metal plate 5, the rib preferably has a shape formed by press chasing, so as not to impair strength and shield effect.

The camera module 1 of the embodiment has an expanded part 43, in a portion of the housing 2 close to a lens frame 13 holding a lens 6. In the expanded part, resin layers are omitted and the metal plate 5 overhangs so that an outer surface thereof is generally flush with an outer surface of the surrounding resin layer. The metal plate 5, having rigidity and lightproof property, partially expands an inside space of the housing 2 without impairing properties required for a body tube containing a group of lenses. This allows decreasing thickness of the housing 2 while avoiding interference between the lens frame 13 and the housing 2.

The housing 2 has a protrusion 44 formed of a portion of the metal plate 5 protruded through the resin layer into the inside space. The protrusion 44 restricts one side of an optical path between the lens 6 and the lens 7. In this manner, enlargement of length of the camera module 1 in a direction of the optical axis X is avoided by the restriction of the optical path by the thin metal plate 5 constituting the housing 2.

The camera modules 1 of the first and second embodiments particularly make it possible to reduce the thickness of the housing 2 in the direction in which the housing 2 opens. Accordingly, an electronic device in which the camera module 1 is installed is allowed to have a thin enclosure such that an area of a projection of the housing 2 in the direction in which the housing 2 opens is maximized.

Figure 9:
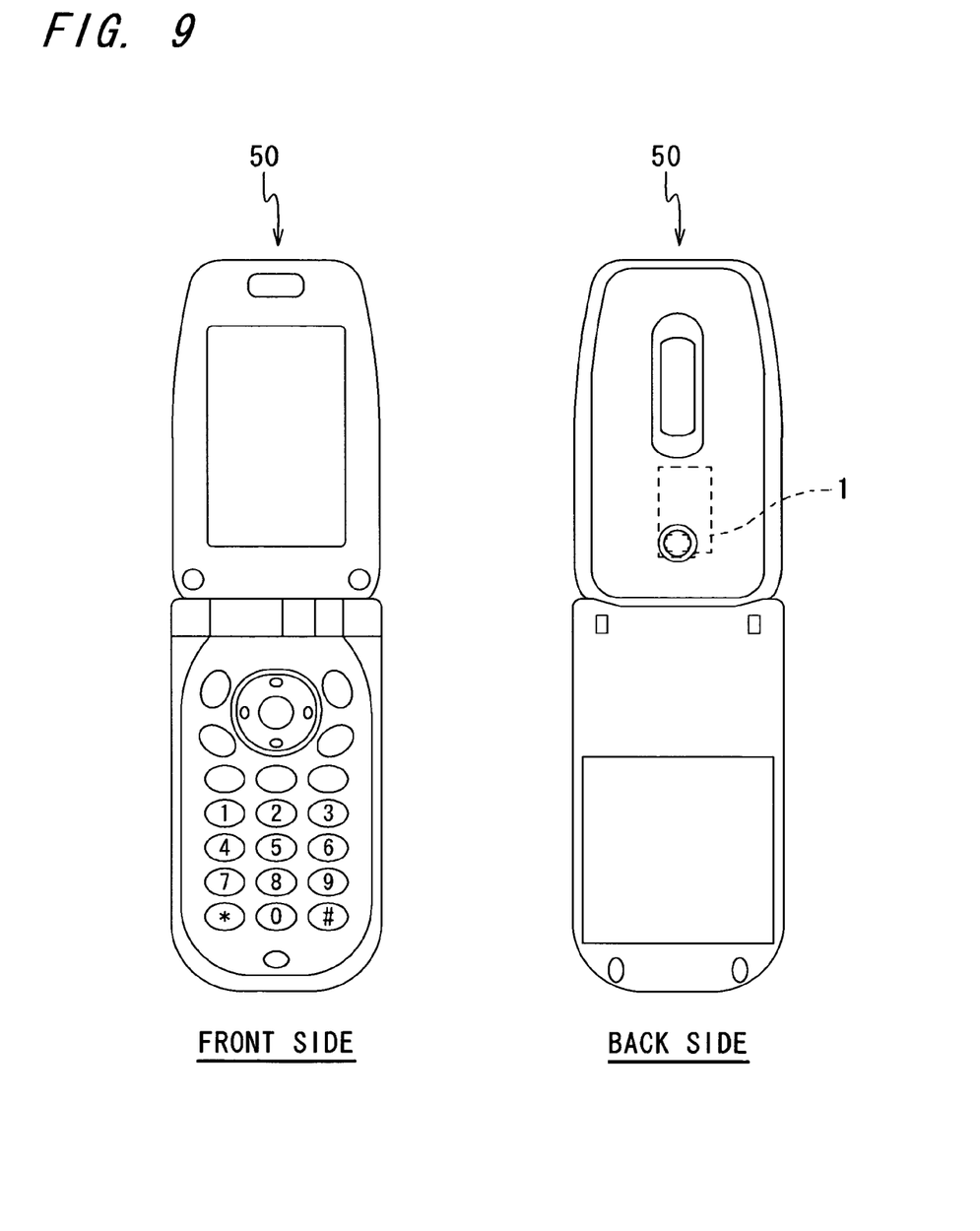
FIG. 9 are a front view and a rear view of a cellular phone having the camera module of FIG. 7.

As an example, FIG. 9 shows a cellular phone 50 in which the camera module 1 of the second embodiment is l ed. As shown, the invention makes it possible to install a camera module having advanced functions such as optical zooming and auto focus in an electronic device such as thin-shaped cellular phone.

As described above, the camera module of the invention has the housing which is molded from resin so that the layers of the resin are formed on both sides of the metal plate and in which the inside space for accommodating the group of lenses is formed and that is opened at least in one direction, the lid for sealing the opened part of the housing, and the substrate on which the imaging element is mounted.

In this configuration, the housing can be provided with electromagnetic shieldability and strength by resin molding with insertion of the metal plate. Details of the shape of the housing are defined by the resin having undergone the molding, and a high dimensional accuracy of the housing is thereby achieved even though the metal plate is a pressing with a low machining accuracy.

In the camera modules 1 of the invention, the housing 2 may generally be shaped like a box and at least one face parallel to the optical axis of the optical system may be opened.

In this configuration, the housing is widely opened, so that the lens group can easily be installed therein. In the housing, the metal plate ensures a sufficient strength even though the housing has a reduced thickness and the large opening. A member covering the opening, which member is not a structural member, does not require high rigidity. Therefore, a thickness of the member can be small so as to increase space efficiency. Furthermore, both the ends of the guide shafts for the lens group can be held by the housing, and thus eccentricity of the lenses can be reduced. Herein, the term "open" does not require that the one face of the housing be thoroughly opened but only requires that the face be opened to such an extent that the lens group can easily be installed therein. Specifically, the face of the housing on which corners or about one-fourth an area thereof on side of the imaging element are closed can be described as a sufficiently "opened" face.

In the camera modules of the invention, the optical system may include a lens that is movable in the directions of the optical axis.

Provided that the optical system includes the movable lens, in particular, work efficiency is greatly improved by the opening of the one face of the housing.

In the camera modules of the invention, the metal plate in the housing may partially be exposed and the substrate may have a ground pattern for contact with the exposed part of the metal plate in the housing.

In this configuration, the effect of electromagnetic shielding is increased by the earth ground of the metal plate in the housing. Preferably, the substrate is a laminated substrate in which ground patterns are provided on a generally whole surface of an outmost layer thereof.

In the camera modules of the invention, the metal plate in the housing may partially be exposed, and the lid may be composed of conductive material and may be in contact with the exposed parts of the metal plate in the housing.

In this configuration, the opened part of the housing can be shielded by the lid.

The camera modules of the invention may further have the substrate cover that is composed of conductive material and that is mounted on the housing so as to cover the substrate. The metal plate in the housing may partially be exposed, and the substrate cover may be in contact with the exposed parts of the metal plate in the housing.

In this configuration, electronic components mounted on the outer side of the substrate can be shielded by the substrate cover and electromagnetic noises are thereby prevented from invading the electronic components. The substrate cover is also capable of effecting shielding against electromagnetic noises radiated from the electronic components to outside. The substrate cover may also serve as a member for fixing the substrate to the housing.

In the camera modules of the invention, the substrate cover may be formed integrally with the lid.

In this configuration, cost reduction can be achieved by decrease in number of components.

The camera modules of the invention may further have the substrate cover that is composed of magnetic material and that is mounted on the housing so as to cover the substrate. The metal plate in the housing may partially be exposed, and the substrate cover may be in contact with the exposed part of the metal plate in the housing.

In this configuration, electromagnetic noises are prevented from invading the electronic components mounted on the outer side of the substrate, and circuits adjacent to the substrate cover are prevented from short circuit even though the substrate cover is not coated when the camera module is installed in an electronic device.

In the camera modules of the invention, the housing may have the expanded part in which the resin layers are partially omitted and in which the metal plate overhangs so that the surface thereof is generally flush with the surface of the surrounding resin layer.

In this configuration, the metal plate has sufficient rigidity and lightproof property. Accordingly, the inside space can partially be expanded by a thickness of the resin so as to contribute to reduction in size of the camera module. Provided that an electronic device in which the camera module is installed has small protrusions or the like, the housing can partially be recessed without increasing the size of the camera module.

In the camera modules of the invention, the rib that bites into the resin layer of the housing may be formed on the metal plate.

The rigidity of the metal plate can be increased by this configuration. The rib is preferably smaller than the thickness of the resin layer so as not to divide the resin layer.

In the camera modules of the invention, the metal plate may have a cutout or an opening connecting the resin layers on both sides of the metal plate.

In this configuration, flow of the resin during the molding can be smoothed and dimensional accuracy of the resin can be ensured.

In the camera modules of the invention, the opening may be formed in vicinity of the gate through which the resin for molding the housing is injected.

In this configuration, particularly, a sufficient amount of resin can be supplied onto both sides of the metal plate, so that the dimensional accuracy is increased.

In the camera modules of the invention, the housing may have a through hole in which the inner periphery of the opening formed on the metal plate is covered with the resin.

In this configuration, the position and the size of the through hole can correctly be reproduced with use of resin. This configuration improves durability of the die for portions around the through hole.

In the camera modules of the invention, the spot facing that exposes the outer surface of the metal plate may be formed on the resin surrounding the through hole.

Provided that the through holes are used as screw holes, in this configuration, the reception of the clamping forces of the screws by the metal plate having high rigidity makes it unnecessary to provide extra reinforcement. Conductive connection can be achieved therein by the screws made of metal.

In the camera modules of the invention, the metal plate may have the protrusion that protrudes through the resin to inside of the housing and that restricts the optical path of the optical system.

In this configuration, the optical path can be restricted by the metal plate excellent in lightproof property.

In the camera modules of the invention, the housing may have the mount hole that exposes the inner surface of the metal plate.

In this configuration, shaft-like members can be fixed to the mount hole and forces in axial directions are thereby received by the metal plate. Accordingly, increase in size of the housing is prevented. The shaft members made of metal can be grounded in conductive connection with the metal plate and thus can be prevented from exercising undesirable electromagnetic effects.

In the camera modules of the invention, the optical system may include an optical member for folding the optical axis, and wherein the folded optical axis is parallel to the opened surface of the housing.

In this configuration, the camera module can further be decreased in thickness in the direction in which the housing is opened (direction of the optical axis prior to the inflection).

In the camera modules of the invention, the metal plate may at least partially constitute all surfaces of the housing.

In this configuration, all the surfaces of the housing can be provided with electromagnetic shieldability and strength.

The electronic device of the invention has any of the camera modules and may preferably have the enclosure such that the area of the projection of the housing in the direction in which the housing is opened is maximized.

In this configuration, the thickness of the electronic equipment can be reduced.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A camera module comprising:
    an optical system for projecting an optical image of a subject,
    an imaging element for converting the optical image projected by the optical system into electric signals,
    a housing which is molded from resin so that resin layers are formed on both sides of a metal plate, in which an inside space for accommodating the optical system is formed, and which is opened at least in one direction,
    a lid for sealing opened part of the housing, and
    a substrate on which the imaging element is mounted.

2. The camera module as claimed in claim 1, wherein the housing is generally shaped like a box and wherein at least one face parallel to an optical axis of the optical system is opened.

3. The camera module as claimed in claim 1, wherein the optical system includes a lens that is movable in directions of the optical axis.

4. The camera module as claimed in claim 1, wherein the metal plate in the housing is partially exposed and wherein the substrate comprises a ground pattern for contact with the exposed part of the metal plate in the housing.

5. The camera module as claimed in claim 1, wherein the metal plate in the housing is partially exposed and wherein the lid is composed of conductive material and is in contact with exposed parts of the metal plate in the housing.

6. The camera module as claimed in claim 1, the camera module further comprising a substrate cover that is composed of conductive material and that is mounted on the housing so as to cover the substrate, wherein the metal plate in the housing is partially exposed and wherein the substrate cover is in contact with exposed parts of the metal plate in the housing.

7. The camera module as claimed in claim 6, wherein the substrate cover is formed integrally with the lid.

8. The camera module as claimed in claim 1, the camera module further comprising a substrate cover that is composed of magnetic material and that is mounted on the housing so as to cover the substrate, wherein the metal plate in the housing is partially exposed and the substrate cover is in contact with exposed part of the metal plate in the housing.

9. The camera module as claimed in claim 1, wherein the housing comprises an expanded part in which the resin layers are partially omitted and in which the metal plate overhangs so that a surface thereof is generally flush with a surface of the surrounding resin layer.

10. The camera module as claimed in claim 1, wherein a rib that bites into the resin layer of the housing is formed on the metal plate.

11. The camera module as claimed in claim 1, wherein the metal plate has a cutout or an opening connecting the resin layers on both sides of the metal plate.

12. The camera module as claimed in claim 11, wherein the opening is formed in vicinity of a gate through which the resin for molding the housing is injected.

13. The camera module as claimed in claim 1, wherein the housing has a through hole in which inner periphery of an opening formed on the metal plate is covered with the resin.

14. The camera module as claimed in claim 13, wherein a spot facing that exposes an outer surface of the metal plate is formed on the resin surrounding the through hole.

15. The camera module as claimed in claim 1, wherein the metal plate has a protrusion that protrudes through the resin to inside of the housing and that restricts an optical path of the optical system.

16. The camera module as claimed in claim 1, wherein the housing has a mount hole that exposes an inner surface of the metal plate.

17. The camera module as claimed in claim 16 wherein a component of a drive mechanism for moving at least part of the optical system in directions of the optical axis is inserted into the mount hole.

18. The camera module as claimed in claim 1, wherein the optical system includes an optical member for folding the optical axis, and wherein the folded optical axis is parallel to the opened surface of the housing.

19. The camera module as claimed in claim 1, wherein the metal plate at least partially constitutes all surfaces of the housing.

20. An electronic device comprising the camera module as claimed in claim 1.

* * * * *